Oct. 7, 1952            C. A. WEISE            2,613,034
THERMOSTATIC OIL COOLER CONTROL WITH SURGE PREVENTING VALVE
Filed Dec. 14, 1942            3 Sheets-Sheet 1
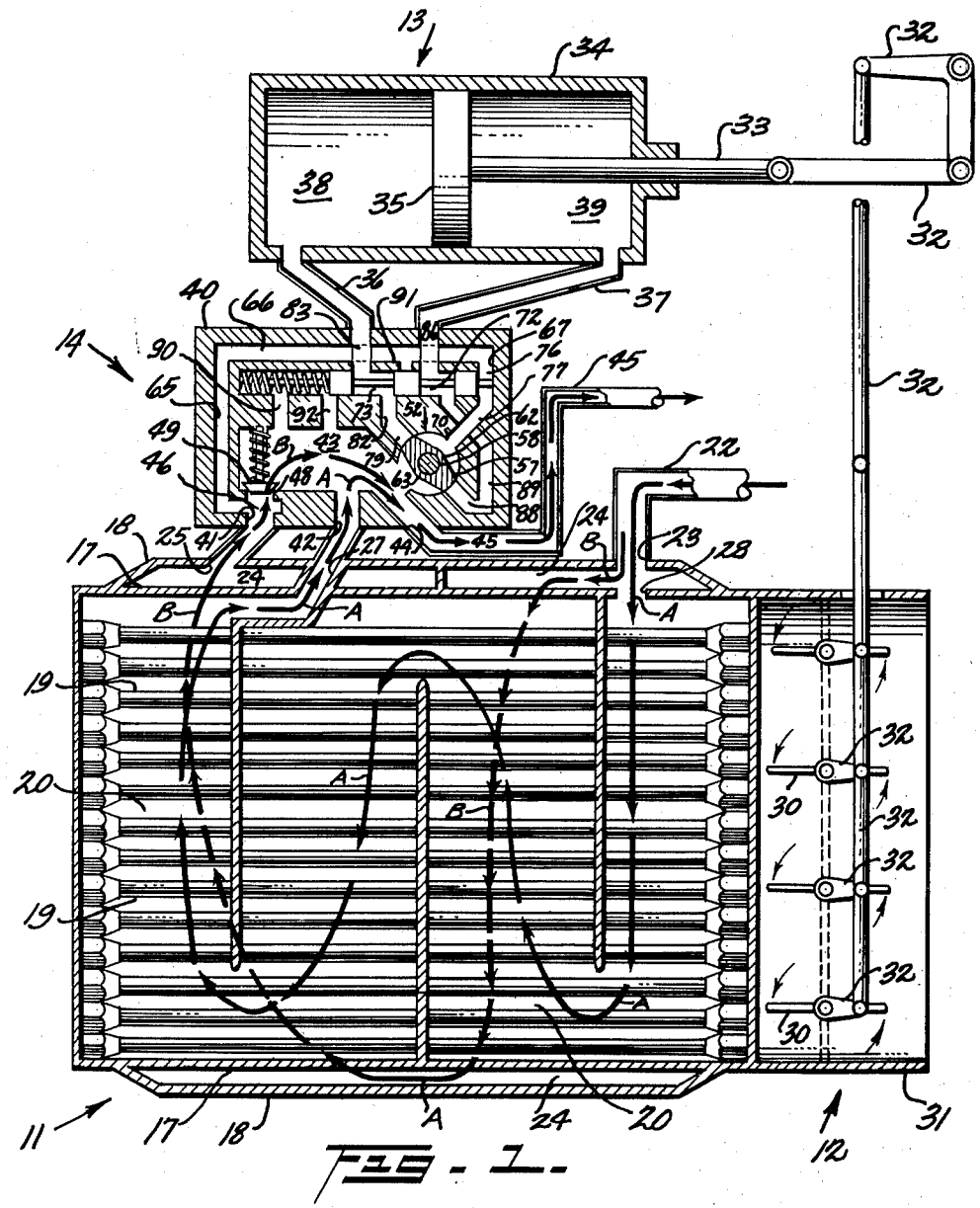
Carl A. Weise
INVENTOR.
BY J Edwin Coate
ATTORNEY Oct. 7, 1952             C. A. WEISE             2,613,034
THERMOSTATIC OIL COOLER CONTROL WITH SURGE PREVENTING VALVE
Filed Dec. 14, 1942             3 Sheets-Sheet 2
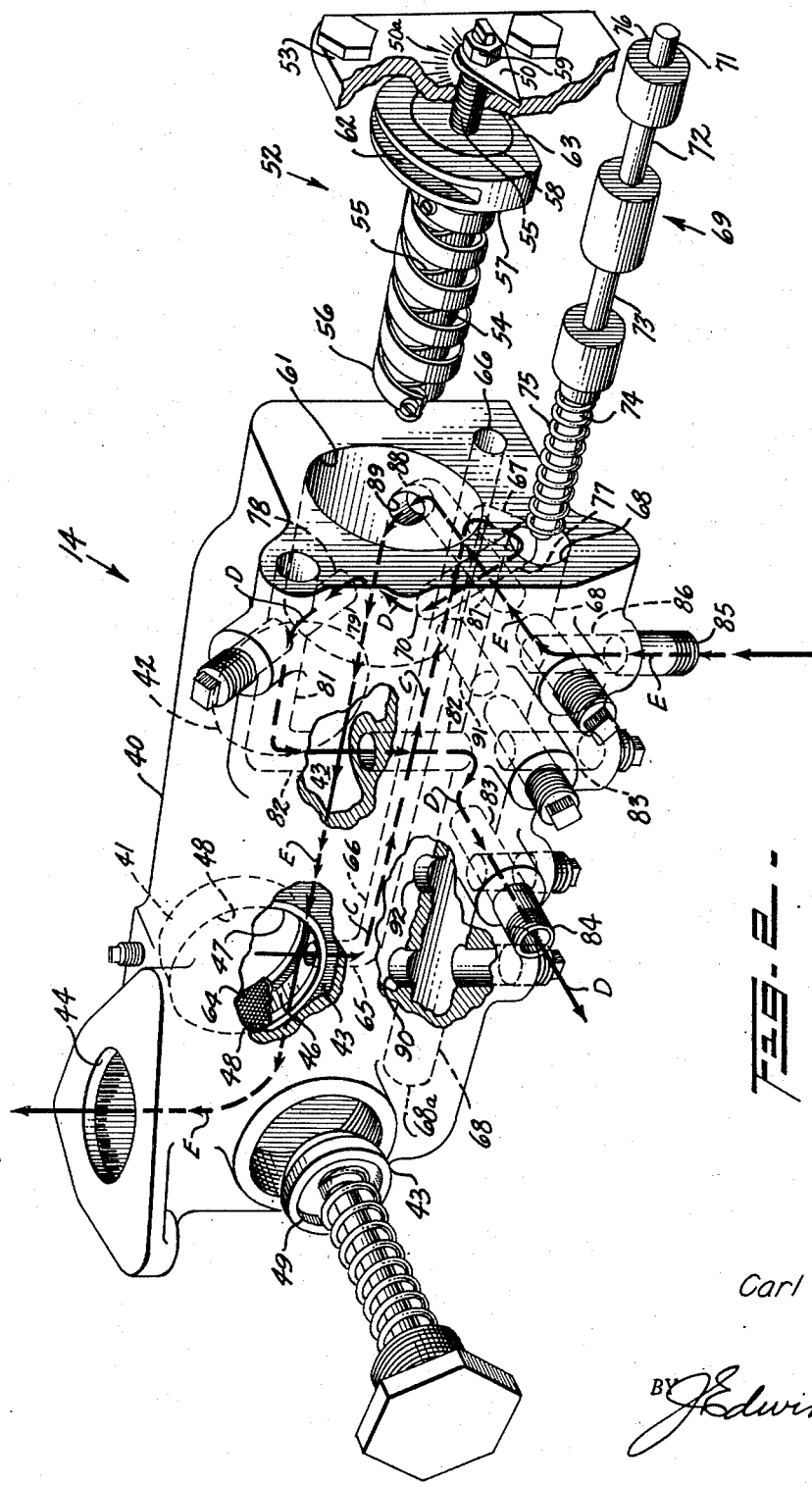
Carl A. Weise
INVENTOR.
BY J. Edwin Coates
ATTORNEY

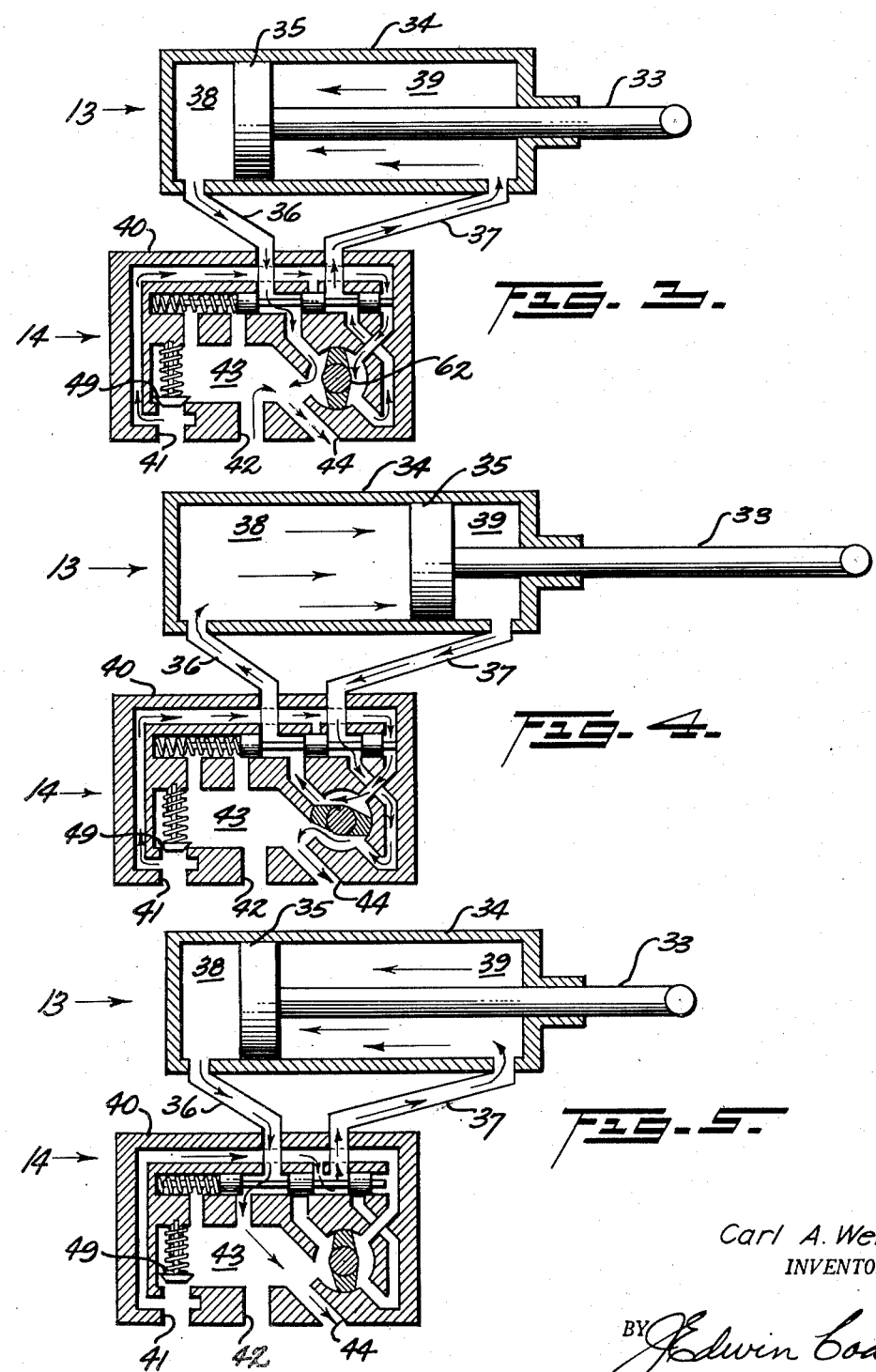

Patented Oct. 7, 1952

2,613,034

UNITED STATES PATENT OFFICE 2,613,034

THERMOSTATIC OIL COOLER CONTROL WITH SURGE PREVENTING VALVE

Carl A. Weise, Los Angeles, Calif., assignor to Douglas Aircraft Company, Inc., Santa Monica, Calif.

Application December 14, 1942, Serial No. 469,013

8 Claims. (Cl. 236—35.3)

This invention relates to an oil cooler for the lubricating system of an internal combustion engine. While the invention is herein described in connection with an oil cooler for the lubricating oil of an aircraft engine, it is applicable to coolers or heat exchangers for cooling a stream of any substance which under ordinary operative conditions is in a liquid state but which by its nature increases substantially in viscosity or becomes semi-solid or solid as the temperature thereof is reduced to low values in the operative use of the liquid, and the word "liquid" as used in the following description and claims includes substances of this character.

As to some of its features, the invention is applicable to any coolers, heaters, or heat exchangers in which one fluid is brought into heat exchange relation with another fluid.

Lubricating oil is supplied to an internal combustion engine at a temperature suitable to operation of the engine and to the lubricating function of the oil. The problem of maintaining at this temperature the oil of an engine lubricating system in a cooler through which the oil passes in heat exchange relation with a stream of coolant fluid such as air is one of the continuous, regulatory control of the rate of flow of the air to vary the rate of heat extraction from the oil in compensation for changes in the temperature of the oil and changes in the flow rate of the oil stream and also in compensation for changes in uncontrollable air stream values, since the air stream has, under some conditions, as in aircraft operation, a fluctuating temperature, density, specific heat, and flow rate which are beyond the control of the operator.

This invention in the embodiment herein disclosed contemplates controlling the airstream by adjusting the position of one or more shutters or air doors by a motor, operated responsively to the temperature of the oil stream, preferably as it leaves the cooler. Under normal conditions, this regulation of the air shutters maintains the temperature of the oil stream entering the engine within satisfactory limits of variations from the desired, optimum value. These normal conditions do not always obtain.

Lubricating oil thickens and later congeals as its temperature is reduced, offering increased resistance in either case to flow through the cooler. In the usual design of an oil cooler, an alternate path for the oil, unrestricted by air tubes, is provided such that when the oil in the cooler is at a low temperature and its resistance to flow is high, this alternate path through or around the cooler is opened and the oil may flow therealong without developing unusual or disastrous pressures within the cooler. At the same time, heat from the oil so flowing along the alternate path may act to supply heat to the oil within the cooler. These conditions can occur upon starting, as a result of rapid reduction of the coolant temperature, as a result of fluctuations in the oil flow, or as a result of extremely low coolant temperatures.

The oil which is following the alternate path is not subjected to the normal cooling and so emerges at a temperature but little below that at entry. If some of the oil is also flowing through the cooler chamber and the oil has congealed therein in layers on the air tubes, this oil also emerges at a high temperature since the congealed oil upon the air tubes, being of low thermal conductivity, inhibits heat transfer from the flowing oil to the air within the tubes. The emerging oil can therefore cause a purely thermally operated control to increase the flow of coolant which aggrevates the abnormal condition characterized by congealing.

This invention, therefore, further contemplates a pressure responsive control supplementary to, and of overriding effect upon, the thermostatic control, which closes the shutters when thickening and/or congealing of the oil proceeds to a point at which the pressure differential between the oil terminals of the cooler exceeds a prescribed value, as for example twenty-five pounds.

It is the object of this invention to provide a thermostatic control for an oil cooler which shall be operated to vary the coolant flow in direct correspondence with the direction and extent of the departures of the oil temperature from a normal prescribed value.

It is another object of the invention to provide a thermostatic control for an oil cooler which effects adjustments of the means controlling a flow of coolant fluid, which adjustments are so correlated to the varying operative conditions that the oil will be cooled to substantially the same normal degree of temperature. This is accomplished by applying power to adjust the control means selectively in either direction in response to temperature departures, and shutting off the power when the optimum adjustment is attained. The position of the shutters is not a function of the cooled oil temperature but an integrated function of the temperature and flow rate of the incoming oil and of the temperature, flow rate, specific gravity and specific heat of the incoming coolant.

To accomplish this result, the hydraulic motor of the embodiment of this invention herein described is double acting and not spring loaded.

It is another object of this invention to provide in a thermostatically controlled oil cooler an overriding, pressure differential control of the flow rate of the coolant fluid which permits thawing of the oil congealed within the cooler.

It is another object of the invention to secure the above objects with a control powered by the lubricating oil under the fluid pressure obtaining at a point upstream from the cooler inlet.

It is another object of the invention to secure the above object in conjunction with a valved bypass means for relieving the high pressure applied to the inlet side of an oil cooler resulting from congealed oil within the cooler chamber or otherwise.

Other objects and advantages will be brought out in the following description taken in connection with the accompanying drawings and appended claims:

In the drawings which are for illustrative purposes only,

Figure 1 is a view partly in section and partly schematic of an oil cooling system embodying this invention, showing the thermostatic control valve in neutral position.

Figure 2 is an exploded perspective view of the control unit of the system shown in Figure 1.

Figure 3 is a schematic view of the control unit and shutter operating motor, showing the regulatory mechanism in the shutter closing position.

Figure 4 is a view similar to Figure 3 showing the regulatory mechanism in the shutter opening position.

Figure 5 is a view similar to Figures 3 and 4, showing the regulatory mechanism operating, in response to a heavy pressure differential between the cooler terminals, to close the shutters, with the temperature-responsive control rendered inoperative.

The oil cooling system shown in the drawings comprises a heat exchanger 11, a shutter mechanism 12, a motor 13 for operating the shutter mechanism, and a control unit 14.

The heat exchanger comprises a cooler drum 17 and warming drum or muff 18 concentrically spaced around the cooler drum 17. The cooler drum encloses a core chamber 20 in which are mounted longitudinally arranged air tubes 19 through which air passes in heat exchange relation with the oil which flows through the spaces between the air tubes 19 in the core chamber 20.

Hot oil from the engine is delivered through the tube 22 to the heat exchanger through an opening 23 leading into the muff chamber 24, this chamber 24 being enclosed between the drums 17 and 18. Oil may then flow, as indicated by arrows B, through the muff chamber to a muff outlet port 25 or, as indicated by arrows A, through an opening 28 in the drum wall 17 into the core chamber 20 to a core outlet port 27.

The heat exchanger 11 is mounted on the airplane in a position to have the slip stream of air from the propeller as well as the relative motion of air and airplane set up air flow through the air tubes. The speed of this airflow is controlled by the shutter mechanism 12. In the fully open position of the shutter mechanism 12 as shown in full lines in Figure 1, the airflow speed is at a maximum value, and in the fully closed position shown in dotted lines the airflow speed is at a minimum value, as determined by air leakage past the shutters.

The shutter mechanism 12 comprises shutters 30 mounted in a cowl extension 31 of the drum 17, and a lever and linkage train 32 which adjusts the shutters in unison when actuated by a piston rod 33 of the hydraulic motor 13. The shutter mechanism may be disposed at either the air inlet or air outlet end of the heat exchanger and the shutter element thereof may take the form of a hinged door on an airduct chamber at either end of the air tubes 19, instead of the shutters shown in the drawings.

The piston rod 33 is a part of the motor 13 which comprises in addition to the rod 33, a hydraulic cylinder 34, a piston 35 reciprocable therein, to which the piston rod 33 is secured and oil tubes 36 and 37 which lead into the end portions 38 and 39 of the chamber of the cylinder 34.

For convenience of illustration, the piston 35 and upper parts of the linkage train 32 are shown in Figure 1 in a position intermediate the limits of their travel and the shutters 30 and lower parts of the linkage train in the wide open limit position of their travel. When the shutters are in the position shown in Figure 1, the piston 35 is in its extreme rightward position.

Flow of oil through the tubes 36 and 37 is controlled by the control unit 14. This unit comprises a housing 40 which is bolted to the heat exchanger unit 11 with two ports 41 and 42 of the housing 40 registering with the muff outlet port 25 and core outlet port 27 respectively.

Referring to Figures 1 and 2, the housing 40 is formed with a central oil chamber 43 into which port 42 opens and from which oil returns to the engine through the outlet port 44 and cooled-oil return tube 45. In thus flowing through the chamber, the oil bathes the length of the bimetallic elements 54 and 56. The chamber 43 also communicates with the muff chamber 24 of the heat exchanger unit 11 through a high pressure passage 46 leading to the registering ports 25 and 41. This passage is fitted with a liner 47 the inner end of which forms a valve seat 48 for a spring loaded valve 49 which is set to open at a prescribed fluid pressure, as for example 30 pounds per square inch. When the differential between the oil pressure in the muff chamber 24 and core chamber 20 and the oil pressure in the chamber 43 reaches this prescribed value, valve 49 opens and the normal flow of oil A from the inlet tube 22 through opening 28 into the core chamber 20, ports 27 and 42 and housing chamber 43 to return tube 45, is replaced by a flow B from the inlet tube 22 through the muff chamber 24, ports 25 and 41 past valve 49 and into housing chamber 43 to return tube 45. (See Figure 1.)

A thermostatic valve device 52 is mounted on a cover plate 53 which forms an end wall of the housing 40. For clarity the cover securing bolt holes in the end face of the housing are not shown in Figure 2. The thermal element of the thermostatic valve device consists of two bimetallic coils, connected at their outer ends, the inner coil 54 being secured at its inner end to a shaft 55 which passes through the cover plate 53 and the outer coil 56 being secured at its inner end to an annular valve 57. The valve 57 is rotatable upon a bearing cylinder 58 formed on the shaft 55. The shaft 55 is held against lengthwise and rotational movement by a nut 59 which draws the adjacent end of the bearing against the inner face of the cover plate 53. By loosening the nut 59 the shaft may be adjusted, angularly in the cover plate, to change the temperature-position relationship of the valve, the end of the shaft being flattened for this purpose. A pointer 50 in front of a dial 50ª serves as a visual indicator for use in adjusting the thermostat.

The valve 57 rotatively fits within a bore 61 in the end wall of the housing 40. Its rim is formed with a grooved port 62 and a diametrically opposite cutaway port 63, each extending arcuately approximately 140 degrees of the valve periphery, the latter port extending the full width of the valve. This valve controls the supply of oil under pressure from high pressure passage 46 to the tubes 36 and 37 leading to the end chambers 38 and 39 of the motor cylinder 34, through a system of passages and chambers formed in the walls of the housing 40.

High pressure oil may flow, as indicated by arrows C, from the passage chamber 46 through an annular screen 64 into passage 65, thence to passage 66 extending lengthwise of the housing, through a diagonal transverse passage 67 to that end of a bore chamber 68 which is adjacent the cover plate 53, this bore chamber extending longitudinally of the housing from the cover plate 53 to a blind end 68ª adjacent the other end of the housing. The bore chamber 68 is occupied by a piston slide valve 69 having a pin 71 of reduced diameter at its cover plate end, annular port passages 72 and 73 and a pin 74 at its inner end. The pins 71 and 74 limit reciprocatory movement of the valve 69. A spring 75 applies a rightward force to the valve. The spring is gauged to permit movement of the valve 69 at a prescribed pressure differential which is somewhat less than that pressure differential which will operate spring loaded valve 49, as for example, 25 pounds per square inch. When the force on valve 69, exerted by the pressure difference between chamber 76 and the chamber at 68ª which communicate with low pressure chamber 43 through a port 90, exceeds the force exerted by spring 75, the piston valve 69 is moved inward or to the left as seen in Figure 2.

High pressure oil after reaching the end valve chamber 76 may flow through a diagonally disposed passage 77 to a high pressure port opening 70 in the bore 61. If the thermostatic valve 57 is in the position shown in Figure 4, oil will then flow as indicated by arrows D across grooved port 62 to a port opening 78, thence through a passage 79 to a longitudinal passage 81 to a transverse passage 82 to piston valve port 73 to a passage 83 to nipple 84 to the tube 36 whence it flows to end chamber 38 of the motor cylinder 34. Oil from the cylinder end chamber 39 may at the same time flow as indicated by arrows E through tube 37 to nipple 85 to passage 86 to valve port 72 to diagonal passage 87 to stub passage 88 valve bore port 89, valve cutaway port 63, outlet chamber 43 and return tube 45. With the thermostat valve in this position, the piston 35 moves in a direction to open the shutters 30 causing them to assume the position shown in full lines in Figure 1. This position of the valve is assumed in response to a rotative movement of the thermostat coils 54 and 56 in a direction correlated with an increase in temperature of the coils.

When the thermostat coils rotate the valve 62 in the other direction in response to subnormal temperature of the oil in the housing chamber 43, the valve 57 assumes the position shown in Figure 3 and oil flows from the high pressure port 70 of bore 61 and thence in reverse order through the passages and ports above recited to the cylinder end chamber 39; at the same time oil flows from cylinder end chamber 38, under the pressure of oil in chamber 39 exerted on the moving piston 35, in reverse order through the ports and passages above recited to the port 78, thence through cutaway port 63 to outlet chamber 43 and return tube 45. As long as the thermostat valve is in this position, the piston 35 will move slowly in a direction to move the shutters 30 toward the closed position shown in dotted lines in Figure 1.

It is obvious that the thermostat will cause a continuing movement of the shutters until the oil temperature settles to a normal value. It is also obvious that the equilibrium temperature of the oil will not fully coincide with the normal temperature in a regulatory system in which the motor piston is actuated in one direction only, by fluid under pressure metered through a port of variable opening which is graduated in its degree of opening by a thermostat or viscosity control device, and this actuation of the piston is opposed by a spring.

When the differential between the pressure in the passage chamber 46, high pressure passages 66 and 67 and end valve chamber 76 and the pressure of low-pressure chamber 43, rises above a prescribed value, piston valve 69 is moved to the left against the spring 75, obturating passages 82 and 87 as shown in Figure 5, rendering the thermostatic control ineffective and opening the end of a transverse passage 91 which leads from passage 66 to bore chamber 68, thereby permitting oil to pass across valve port 72 to nipple 85 to the motor cylinder to move the piston in a direction to close the shutters 30. Oil is forced out of motor cylinder chamber, goes from nipple 84 across valve port 73 to a stub passage 92 into outlet chamber 43 and to return tube 45. When oil congeals in the core, the pressure differential between the inlet tube 22 and outlet chamber is sufficient to thus move the piston valve 69 closing the shutter and allowing the heat of the oil coming in from the engine passing through and/or around the core to melt the congealed oil. Without this override pressure control of the shutters, the hot oil, flowing through the air tubes covered with heat insulating congealed oil, would act on the thermostat to hold the shutters open defeating the very purpose which the thermostat is designed to accomplish and does accomplish under other than the extreme condition of oil congealing.

If the oil pressure, after rightward movement of the piston valve 69 continues to rise, the valve 49 will open, protecting the core and muff from bursting pressures and allowing the oil to flow back to the engine uncooled by passage through the cooler. The oil however under these conditions flows through the muff chamber 24 both warming the congealed oil in the core and becoming partially cooled for re-entrance into the engine.

I claim:

1. In a system for cooling the liquid of a liquid stream under pressure, the combination of: a cooler having a liquid inlet and a liquid outlet and a liquid passage connecting the inlet and outlet and cooled by an airstream; shutter means for the airstream; means for adjusting the shutter means between limiting positions of maximum and minimum closure; a double acting hydraulic motor for operating said adjusting means in either direction; first and second conduit means flow connected to said motor for operating it in opposite directions to open and close said shutter means respectively; third conduit means connected to said liquid stream upstream from said inlet; fourth conduit means connected to said liquid stream downstream from said outlet; a reversibly movable valve for selectively either flow connecting said first and third conduits and flow connecting said second and fourth conduits of flow connecting said first and fourth conduits and said second and third conduits; a thermostat in the liquid stream downstream from said outlet for operating said valve to connect said third and second conduits and to connect said first and fourth conduits in response to subnormal liquid temperatures and to connect said first and third conduits and said second and fourth conduits in response to supernormal liquid temperatures; a piston valve having first and second port passages interposed in and normally open across said first and second conduits respectively; a fifth conduit means connecting said liquid stream upstream from said inlet to said second conduit, said piston valve normally closing said fifth conduit and being movable to dispose said second port passage to open said fifth conduit; a sixth conduit means connecting said liquid stream upstream from said inlet with a chamber, having exposed thereto a working face at one end of said piston valve for moving said piston valve in one direction; a seventh conduit connecting the bore of said piston valve to said fourth conduit; and a spring for moving said piston valve in the other direction, said movement of said piston valve from normal position in said one direction closing said first and second conduits across said port passages, disposing said second port passage to open said fifth conduit and disposing said first port passage to connect said first conduit to said seventh conduit.

2. A device for cooling the liquid of a liquid stream comprising: a cooler having a liquid inlet and a liquid outlet interconnected by a liquid passage; means for supplying a coolant to said cooler; means for adjusting the rate of supply of said coolant; a cylinder; a piston operating therein; means connecting said piston and said adjusting means whereby movement of said piston in one direction operates said adjusting means to decrease the supply of said coolant and movement of said piston in the opposite direction operates said adjusting means to increase the supply of said coolant; a valve chamber connected to a source of fluid under pressure; a conduit leading from said chamber to each end of said cylinder; a valve disposed in said chamber for controlling the flow of a fluid under pressure through said conduits; thermostatic means subject to the temperature of the liquid to be cooled for operating said valve and responsive to a predetermined increase in the temperature of said liquid for moving said valve to a position in which the high pressure fluid flows through one of said conduits into the end of said cylinder to move the piston therein in the direction to operate said adjusting means to increase the supply of said coolant; said thermostatic means being operable in response to a predetermined decrease in the temperature of said liquid to move said valve to a position in said chamber wherein said fluid flows through the other of said conduits into the opposite end of said cylinder to move the piston to operate said adjusting means to decrease the supply of said coolant; a valve for controlling the flow of high pressure fluid in each conduit; means normally holding each valve in a position in which said conduits are open for flow of said fluid under the control of said thermostatic means; and means responsive to a predetermined increase in pressure of said fluid for moving said valves to a position in which said valves close said conduits to fluid flow, thereby rendering inoperative said thermostatic means to control fluid flow through said conduits and simultaneously directing the fluid into the end of said cylinder to cause said piston to move in the direction to operate said adjusting means to decrease the supply of said coolant.

3. A temperature control system for cooling the liquid of a liquid stream circulated under pressure, comprising: a heat exchange unit connected into said stream; means for supplying a coolant to said unit for extracting heat from the liquid flowing therethrough; means defining an unrestricted passageway interconnecting the inlet and outlet of said unit; means for adjusting the rate of supply of said coolant; a cylinder; a piston operating therein; means connecting said piston and said adjusting means whereby movement of said piston in one direction operates said adjusting means to decrease the supply of said coolant and movement of said piston in the opposite direction operates said adjusting means to increase the supply of said coolant; a valve chamber; conduits leading from said chamber to opposite ends of said cylinder; a conduit interconnecting said chamber and the outlet end of said unrestricted passageway; a valve disposed in said chamber for controlling the flow of the fluid from said last-named conduit into and through one or the other of said first-named conduits; means responsive solely to changes in the temperature of the liquid passed through said heat exchange unit for operating said valve and operative upon a preselected increase in the temperature of said liquid for moving said valve to a position in which the liquid passed through said unrestricted passageway is flow connected into the end of said cylinder to so pressurally move the piston thereing as to operate said adjusting means to increase the supply of said coolant; said means being operable in response to a preselected decrease in the temperature of said liquid to move said valve to a position in said chamber wherein the liquid flowing through said passageway flows into the opposite end of the cylinder to so pressurally move the piston as to operate said adjusting means to decrease the supply of said coolant; and a normally inoperative control means for operating said piston in a direction to produce operation of said adjusting means to decrease the supply of said coolant; said secondary control means including means made operative upon a predetermined increase in the pressure of the liquid flowing through said passageway for obstructing the flow of liquid into said chamber and diverting said liquid into the end of said cylinder to pressurally move the piston therein to operate said adjusting means to decrease the supply of said coolant.

4. A temperature control system for cooling the liquid of a circulating liquid stream under pressure, comprising: a heat exchange unit connected into said stream; means for supplying a coolant to said unit for extracting heat from the liquid flowing therethrough; means defining an unrestricted passageway interconnecting the inlet and outlet of said unit; means for adjusting the rate of supply of said coolant; a cylinder; a piston operating therein; means connecting said piston and said adjusting means whereby movement of said piston in one direction operates said adjusting means to decrease the supply of said coolant and movement of said piston in the opposite direction operates said adjusting means to increase the supply of said coolant; a valve chamber; conduits leading from said chamber to opposite ends of said cylinder; a conduit interconnecting said chamber and the outlet end of said unrestricted passageway; a valve disposed in said chamber for controlling the flow of the fluid from said last-named conduit into and through one or the other of said first-named conduits; means responsive solely to changes in the temperature of the liquid passed through said heat exchange unit for operating said valve and operative upon a preselected increase in the temperature of said liquid for moving said valve to a position in which the liquid passed through said unrestricted passageway is flow connected into the end of said cylinder to so pressurally move said piston as to operate said adjusting means to increase the supply of said coolant; said means being operable in response to a preselected decrease in the temperature of said liquid to move said valve to a position in said chamber wherein the liquid flowing thereinto is directed through the conduit leading to the opposite end of the cylinder to so pressurally move the piston as to operate said adjusting means to decrease the supply of said coolant; and a normally inoperative control means for operating said piston in a direction to produce operation of said adjusting means to decrease the supply of said coolant; said secondary control means including valve means for controlling fluid flow from said passageway to said chamber; said valve means being normally held in a position in which liquid is free to flow into said chamber and movable upon a predetermined increase in the pressure of the liquid flowing through said passageway to a position closing the flow of liquid into said chamber and simultaneously diverting the same into the end of said cylinder to so pressurally move the piston therein as to operate said adjusting means to decrease the supply of said coolant, whereby said temperature responsive means is rendered inoperative to control the operation of the piston.

5. In an oil cooling system for an oil cooler in an aircraft, having shutter means to control the flow of air through said oil cooler, the combination of: a fluid operated device for moving said shutter means back and forth, having a shell part and an inner part moving therein, one of said parts being connected to a support and the other of said parts being connected to said shutter means, said device having a closing port and an opening port into which fluid may be respectively directed so as to cause said device to close and open said shutter means; a control unit having an inlet passage for conducting oil into the cooler and an outlet passage for conducting oil away from the cooler; a thermostat in said outlet passage exposed to the flow of oil therein; a four-way valve means having a first service port and a second service port and means including said four-way valve means connected to and operated by said thermostat so as to connect said inlet passage with said first service port and said outlet passage with said second service port in response to a decrease in the temperature of said thermostat and to connect said inlet passage with said second service port and said first service port with said outlet passage in response to a rise in the temperature of said thermostat; a first conduit extending from said first service port of said valve means to said closing port of said device and a second conduit extending from said second service port of said valve means to said opening port of said device; and an auxiliary valve operating in response to an increase in the pressure drop between said inlet passage and said outlet passage above a predetermined value to disconnect said conduits from said valve means and connect said first and second conduits respectively to said inlet passage and said outlet passage so that there will be a flow of oil from said inlet passage to said device to close said shutter means independently of the controlling action of said thermostat.

6. In an oil cooling system for an oil cooler in an aircraft, having shutter means to control the flow of air through said oil cooler, the combination of: a fluid operated device for moving said shutter means back and forth, having a shell part and an inner part moving therein, one of said parts being connected to a support and the other of said parts being connected to said shutter means, said device having a closing port and an opening port into which fluid may be respectively directed so as to cause said device to close and open said shutter means; a control unit having an inlet passage for conducting oil into the cooler and an outlet passage for conducting oil away from the cooler; a thermostat in said outlet passage exposed to the flow of oil therein; a four-way valve means having a first service port and a second service port and means connected to and operated by said thermostat so as to connect said inlet passage with said first port and said outlet passage with said second port in response to a decrease in the temperature of said thermostat and to connect said inlet passage with said second port and said first port with said outlet passage in response to a rise in the temperature of said thermostat; a first conduit extending from said first port of said valve means to said closing port of said device and a second conduit extending from said second port of said valve means to said opening port of said device; and an auxiliary valve operating in response to an increase in the pressure drop between said inlet passage and said outlet passage above a predetermined value to disconnect said first and second ports from said valve means and connect said first and second ports respectively to said inlet passage and said outlet passage so that there will be a flow of oil from said inlet passage to said device to close said shutter means independently of the controlling action of said thermostat.

7. A temperature control system for cooling the liquid of a liquid stream circulated under pressure, comprising: a heat exchange unit connected into said stream; means for supplying a coolant to said unit for extracting heat from the liquid flowing therethrough; means defining an unrestricted passageway interconnecting the inlet and outlet of said unit; means for adjusting the rate of supply of said coolant; a cylinder; a piston operating therein; means connecting said piston and said adjusting means whereby movement of said piston in one direction operates said adjusting means to decrease the supply of said coolant and movement of said piston in the opposite direction operates said adjusting means to increase the supply of said coolant; a valve chamber; conduits leading from said chamber to opposite ends of said cylinder; a conduit interconnecting said chamber and the outlet end of said unrestricted passageway; a valve disposed in said chamber for controlling the flow of the fluid from said last-named conduit into and through one or the other of said first-named conduits; means responsive solely to changes in the temperature of the liquid passed through said heat exchange unit for operating said valve and operative upon a preselected increase in the temperature of said liquid for moving said valve to a position in which the liquid passed through said unrestricted passageway is flow connected into the end of said cylinder to so pressurally move the piston therein as to operate said adjusting means to increase the supply of said coolant; said means being operable in response to a preselected decrease in the temperature of said liquid to move said valve to a position in said chamber wherein the liquid flowing through said passageway flows into the opposite end of the cylinder to so pressurally move the piston as to operate said adjusting means to decrease the supply of said coolant; a normally inoperative control means for operating said piston in a direction to produce operation of said adjusting means to decrease the supply of said coolant; said secondary control means including means made operative upon a predetermined increase in the pressure of the liquid flowing through said passageway for obstructing the flow of liquid into said chamber and diverting said liquid into the end of said cylinder to pressurally move the piston therein to operate said adjusting means to decrease the supply of said coolant; a by-pass conduit leading from the outlet end of said unrestricted passageway; and a pressure responsive valve normally closing said by-pass conduit, said last named valve opening upon an increase in pressure of the liquid flowing through said passageway to a pre-selected value in excess of the pressure value rendering operative said secondary control, whereby said unrestricted passageway is flow connected to said by-pass conduit thereby relieving said passageway and heat exchange unit from bursting pressures developed by the liquid.

8. A temperature control system for cooling the liquid of a circulating liquid stream under pressure, comprising: a heat exchange unit connected into said stream; means for supplying a coolant to said unit for extracting heat from the liquid flowing therethrough; means defining an unrestricted passageway interconnecting the inlet and outlet of said unit; means for adjusting the rate of supply of said coolant; a cylinder; a piston operating therein; means connecting said piston and said adjusting means whereby movement of said piston in one direction operates said adjusting means to decrease the supply of said coolant and movement of said piston in the opposite direction operates said adjusting means to increase the supply of said coolant; a valve chamber; conduits leading from said chamber to opposite ends of said cylinder; a conduit interconnecting said chamber and the outlet end of said unrestricted passageway; a valve disposed in said chamber for controlling the flow of the fluid from said last-named conduit into and through one or the other of said first-named conduits; means responsive solely to changes in the temperature of the liquid passed through said heat exchange unit for operating said valve and operative upon a preselected increase in the temperature of said liquid for moving said valve to a position in which the liquid passed through said unrestricted passageway is flow connected into the end of said cylinder to so pressurally move said piston as to operate said adjusting means to increase the supply of said coolant; said means being operable in response to a preselected decrease in the temperature of said liquid to move said valve to a position in said chamber wherein the liquid flowing thereinto is directed through the conduit leading to the opposite end of the cylinder to so pressurally move the piston as to operate said adjusting means to decrease the supply of said coolant; a normally inoperative control means for operating said piston in a direction to produce operation of said adjusting means to decrease the supply of said coolant; said secondary control means including valve means for controlling fluid flow from said passageway to said chamber; said valve means being normally held in a position in which liquid is free to flow into said chamber and movable upon a predetermined increase in the pressure of the liquid flowing through said passageway to a position closing the flow of liquid into said chamber and simultaneously diverting the same into the end of said cylinder to so pressurally move the piston therein as to operate said adjusting means to decrease the supply of said coolant, whereby said temperature responsive means is rendered inoperative to control the operation of the piston; a by-pass conduit leading from the outlet of said unrestricted passageway; and a pressure-responsive valve normally closing said by-pass conduit, said last named valve opening upon an increase in pressure of the liquid flowing through said passageway to a pre-selected value in excess of the pressure value rendering operative the valve means of said secondary control, whereby said unrestricted passageway is flow connected to said by-pass conduit thereby relieving said passageway and heat exchange unit from bursting pressures developed by the liquid.

CARL A. WEISE.

REFERENCES CITED

The following references are of record in the file of this patent:

UNITED STATES PATENTS

| Number | Name | Date |
|---|---|---|
| 1,165,098 | Herr | Dec. 21, 1915 |
| 1,481,307 | Stuart | Jan. 22, 1924 |
| 1,853,194 | Bogle | Apr. 12, 1932 |
| 1,962,676 | Albright | June 12, 1934 |
| 2,081,762 | Nissen | May 25, 1937 |
| 2,110,454 | Sinclair | Mar. 8, 1938 |
| 2,249,952 | Gerstung | July 22, 1941 |
| 2,275,576 | Ware | Mar. 10, 1942 |
| 2,288,877 | Andersen | July 7, 1942 |
| 2,291,607 | Chausson | Aug. 4, 1942 |
| 2,301,665 | Dykeman | Nov. 10, 1942 |
| 2,314,937 | Hannon | Mar. 30, 1943 |
| 2,323,927 | Mercier | July 13, 1943 |
| 2,348,212 | Gill | May 9, 1944 |
| 2,365,223 | Silverstein | Dec. 19, 1944 |
| 2,474,162 | Ramsaur | June 21, 1949 |

FOREIGN PATENTS

| Number | Country | Date |
|---|---|---|
| 305,052 | Germany | Oct. 18, 1919 |
| 377,072 | Italy | Dec. 7, 1939 |
| 463,313 | Great Britain | Mar. 19, 1937 |